ant Examiner—M. J. Andrews

United States Patent [19]
Bruno et al.

[11] 3,839,019
[45] Oct. 1, 1974

[54] PURIFICATION OF ALUMINUM WITH TURBINE BLADE AGITATION

[75] Inventors: Marshall J. Bruno, Greensburg; Noel Jarrett, Lower Burrell; Burl L. Slaugenhaupt, Apollo; Robert E. Graziano, Arnold, all of Pa.

[73] Assignee: Aluminum Company of America, Pittsburgh, Pa.

[22] Filed: Aug. 16, 1973

[21] Appl. No.: 388,806

Related U.S. Application Data

[63] Continuation-in-part of Ser. No. 289,588, Sept. 18, 1972.

[52] U.S. Cl. ............................ 75/68 R, 266/34 A
[51] Int. Cl. ........................................... C22b 21/06
[58] Field of Search .................. 75/68 R; 266/34 A

[56] References Cited
UNITED STATES PATENTS

| | | | |
|---|---|---|---|
| 3,537,987 | 11/1970 | Copeland | 75/68 |
| 3,743,263 | 7/1973 | Szekely | 266/34 |

*Primary Examiner*—L. Dewayne Rutledge
*Assistant Examiner*—M. J. Andrews
*Attorney, Agent, or Firm*—Carl R. Lippert

[57] ABSTRACT

Aluminum is purified by chloridizing a molten body of aluminum in a highly efficient manner. High metal chloridization rates are achieved in a system wherein chlorine utilization efficiency is 100 percent or very closely approaches this level. The system includes a chlorine-metal contacting technique which includes an agitator and which controls and maintains contacting conditions to optimize efficiency.

40 Claims, 5 Drawing Figures

PURIFICATION OF ALUMINUM WITH TURBINE BLADE AGITATION

BACKGROUND OF THE INVENTION

This application is a continuation-in-part of U.S. Ser. No. 289,588, filed Sept. 18, 1972.

As is known, molten aluminum is treated to remove various types of impurities including dissolved gas, oxides and metallic impurities. The term "aluminum" is intended to mean aluminum and alloys containing at least 50 percent or 75 percent or more of aluminum. Certain metallic impurities are frequently encountered in aluminum whether the source of the aluminum is the primary (derived by smelting alumina) or secondary (derived from aluminum scrap sources). These metallic impurities include mostly magnesium but also sodium and calcium and may be introduced through remelting of scrap metal or they may stem from the refining process. It is often desirable to remove these metals, especially magnesium, which can reach levels approaching 5 percent especially where the metal is derived from scrap recovery. Where it is desired to reduce the magnesium to a lower level it is well known that magnesium and other metals more electropositive than aluminum can be removed by contacting the molten aluminum with chlorine or a reactive vaporous chloride to form the chloride salt of the impurity metal which salt rises to the surface of the melt. This process has been referred to as chloridizing aluminum. Chloridizing aluminum has been widely employed by simply bubbling chlorine gas through the molten metal while it is in a furnace or holding vessel. Although this technique is beneficial in removing metallic impurities such as magnesium and also in reducing the gas content and nonmetallic (oxide) content of the melt, it is highly inefficient with respect to both chlorine utilization and chlorine conversion to the desired impurity metal chloride salt and inherently produces substantial quantities of noxious fumes and undesirable particulate effluent thereby creating serious pollution problems. These gases are for the most part unreacted chlorine and aluminum chloride which tends to form under chlorine contacting conditions which are insufficient to allow the chlorine to react directly with the metallic impurities. The aluminum chloride upon contacting moisture in the air hydrolyzes to form HCl and $Al_2O_3$ dust, both of which present serious pollution problems. Numerous techniques have been proposed to alleviate these conditions. For instance it has been proposed to bubble chlorine through a melt under a salt cover and control the composition and depth of the salt cover in order to dissolve aluminum chloride gas which forms as the result of inefficient chlorine-metal contacting. The aluminum chloride dissolved in the salt cover is then available for back reaction with the metallic impurities such as magnesium which it is desired to remove. This system is capable of operation at reduced fume levels or substantially fume-free levels and offers some improvement over the old fashioned furnace fluxing but evidence to date suggests it is not readily capable of efficient chlorine utilization in a continuous process. In order to achieve high chlorine utilization the system involves a recycling technique wherein the metal is recycled through a chloridization chamber in order to permit the chlorination and back reaction effects to occur sufficiently to achieve adequate chlorine utilization levels.

DESCRIPTION

In accordance with the present invention the highest possible chlorine utilization levels are achieved at very high metal processing rates thereby enabling continuous operation without metal recirculation and chlorine efficiency levels of 100 percent or levels very closely approaching 100 percent. The system contemplates chloridization under properly controlled chlorine-metal contacting conditions which improve the reaction efficiencies between the chlorine and the metallic impurities essentially to levels not heretobefore considered possible on a commercial basis. The efficiencies referred to are not only based on the reaction of the chlorine itself, but more significantly, on the desired conversion of chlorine to the impurity metal salt. That is, considering an aluminum melt where it is desired to remove magnesium, an efficiency of 100 percent in reacting chlorine is not as important as the fact that substantially all of the chlorine reacts with magnesium (as opposed to reacting with aluminum). A further benefit of the invention is that the impurity level, for instance the magnesium level, in the treated aluminum can be controlled to very precise levels and this alone is a matter of great importance in a commercial operation. The improved aluminum treatment process enables controlling magnesium content to within plus or minus 0.02 percent in a continuous process. This is most desirable in a commercial plant where removing too much magnesium could be highly disruptive since the objective in treating the aluminum is often not to simply reduce an impurity metal such as magnesium as low as possible but rather to reduce it to a defined and controlled level.

In this description reference is made to the drawings in which.

Figure 1:
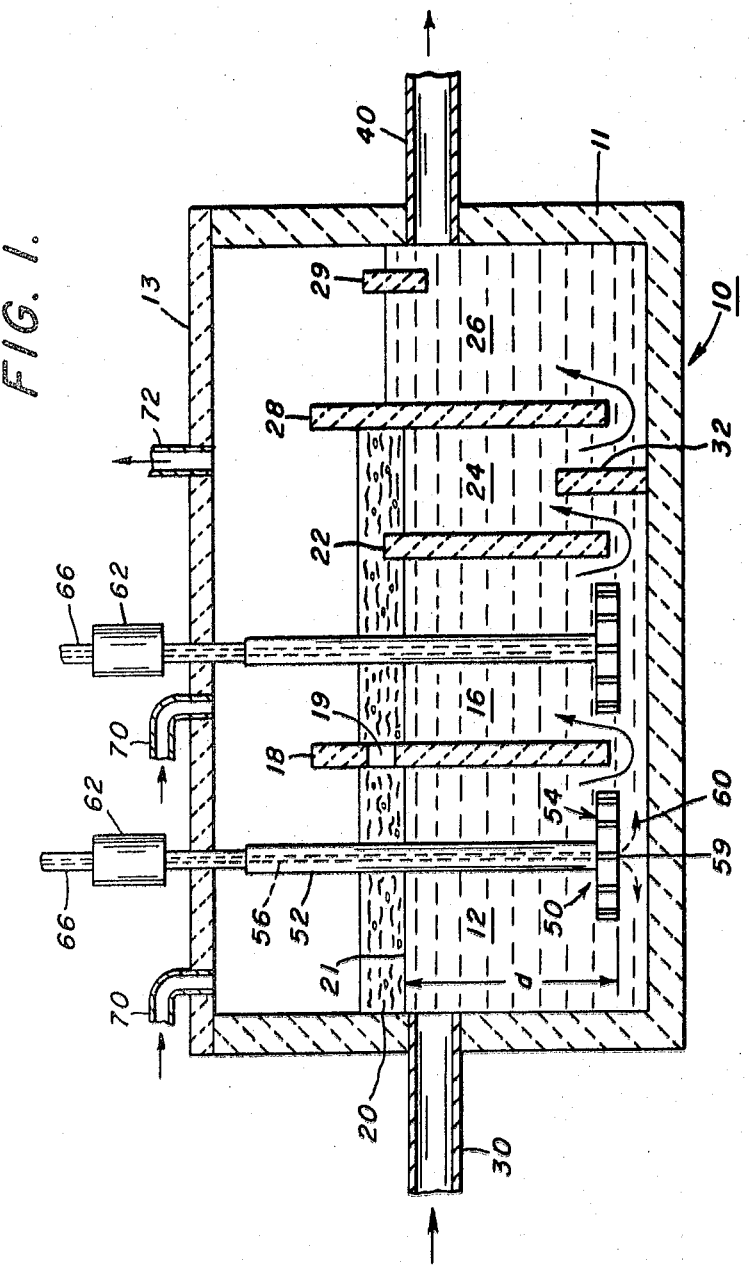
FIG. 1 is an elevation view in cross section schematically depicting the operation of the improved system and showing one arrangement suitable in practicing the invention.

A suitable arrangement for carrying out the invention is depicted in FIG. 1 wherein the system 10 includes first and second reaction or chloridization chambers or zones 12 and 16 separated by a baffle 18. Another baffle 22 separates second reaction chamber 16 from a settling chamber 24 which is then separated by baffle 28 from an outlet chamber 26 containing purified metal. Metal enters the system through inlet 30 and moves through the first reaction zone 12 from which it passes to the second zone 16 by moving under baffle 18. In each reaction or chloridization chamber, the molten aluminum is chloridized by contact with a reactive chlorinaceous gas, preferably chlorine, under hereinafter described carefully controlled conditions which result in very high chloridization rates and efficiencies. The chloridization reaction products, chloride salts of the metallic impurities, form a salt layer 20 above the molten aluminum.

From the second reaction chamber 16 the metal passes under baffle 22 into the first settling chamber 24 where a settling action separates the heavier metal from the salt chloridization reaction products. Movement into chamber 24 is assured by bottom baffle 32 which imparts an upward movement of the metal-salt mixture into the chamber 24 to facilitate the desired phase separation and to prevent bypassing chamber 24 and moving directly into chamber 26. The metal then is moved from chamber 24 under baffle 28 into final chamber 26 prior to exiting through outlet 40. A final skim type baffle 29 may be provided to further assure a substantially salt-free stream at the outlet 40. The over-all container 11 housing the system is closed by a suitable lid 13 in order to maintain a moisture-free atmosphere so as to avoid oxide formation and to prevent the escape of any fumes to the atmosphere. In this connection it is preferred that the system feature a substantially constant purge with a dry non-reactive gas such as nitrogen or argon or any of the inert gases or carbon dioxide. Thus it is preferred to introduce a purge gas through purge inlets 70, the purge then exiting through purge exit 72. The dry inert purge offers the advantage of assuring a moisture-free atmosphere above the molten salt and metal as well as sweeping away any hydrogen gas removed from the metal. It is advantageous to provide a separate purge inlet 70 for each chloridization zone, as shown in FIG. 1, to provide the best assurance against the presence of any air above the chloridization zone since any air can cause considerable corrosion problems especially with respect to the rotating impeller shaft.

Baffle 18 has an opening 19 positioned to connect the salt phase 20 across both reaction zones 12 and 16. The top edge of baffle 22 is positioned to similarly provide a salt phase connection. Connecting the salt phase between reacting and settling zones prevents excessive build-up in any single zone while facilitating salt removal from all zones or chambers at a single site. Of course there is no salt phase connection desired across baffle 28 into the purified metal zone 26 which is desired to be substantially salt-free. In fact the container walls, fashioned from suitable refractory materials as explained hereinafter, are preferably housed in a water cooled jacket which is suitably fashioned from steel. Cooling the walls tends to prevent molten salt movement through the refractory by creating a salt freeze line within the refractory. This is especially important with respect to the junction of baffle 28 with the side walls of the container 11. The baffle is embedded in the side walls but salt can diffuse around the baffle and into the pure metal zone 26. Establishing a salt freeze line before the lateral extremity of the baffle 28 prevents this salt movement.

Figure 2:
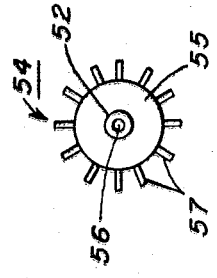
FIG. 2 is a plan view of the dispersing means shown in FIG. 1.

In each of the reaction chambers is a disperser 50 comprising a rotating shaft 52 and an agitator blade or impeller 54. Shaft 52 features a hollow center conduit or path 56 to function as a conduit for the chlorine or other reactive chlorinaceous gas which then passes from the gas inlet 59 beneath the impeller 54 and into the melt as indicated by arrows 60. The agitator shaft 52 is rotated by means 62 which may be an electrical or air driven motor. Chlorine is introduced through connection 66 and passes downwardly through conduit 56 for introduction through the gas inlet 59 into the molten metal introduced into the first reaction chamber or zone 12. A like effect occurs in the second zone 16. The impeller 54 depicted in FIG. 2 is of a turbine variety having a central hub portion 55 and radially extending blade members 57. The chlorine is introduced to the melt through the gas inlet 59 in the bottom of the impeller and is segregated into small bubbles and dispersed throughout the reaction chamber 12 by the action of the rotating impeller. The magnesium or other metallic impurity in the melt reacts with the chlorine to form magnesium chloride or other impurity metal chloride salt which rises to form molten salt layer 20.

There are a number of aspects which must be carefully controlled in order to achieve the chlorination efficiencies in accordance with the invention. It is essential that the depth of metal d between the metal-salt interface and the chlorine introduction site be at least 10 inches and preferably at least 15 inches with levels of 20 or more inches being most desirable. The depth $d$ referred to is the vertical distance from the metal-salt interface 21 down to the bottom of the impeller, that is the gas dispersion site. This is accomplished by constructing chamber 11 of sufficient proportions to assure that the depth of the impeller 54 is such as to allow for a sufficient distance $d$. The proper molten aluminum depth d above the chlorine introduction site has been found to be of critical importance to achieve the gas-metal contact times necessary to reach the high efficiencies in accordance with the invention. While the agitation of the chloridization zones might be considered to overshadow such considerations as metal depth, it nonetheless has been found that metal depth is of great importance in the improved process as it provides for proper gas retention time in the reaction zone. If the depth goes below 15 inches, chloridization efficiencies will drop to levels below those most desired for some applications and 15 inches is accordingly a preferred minimum. If the depth drops significantly below 10 inches the efficiencies are excessively lowered. These drops in efficiency can permit significant amounts of chloridizing gas to escape the metal phase and be lost to the direct chloridization reaction so important in achieving the very high chloridization efficiencies in accordance with the invention. These high efficiencies by direct chloridization are most important to the success of continuous operation.

The molten metal depth prior to starting the system should be well above that which provides the minimum desired distance d since the salt layer 20 steadily increases in thickness during operation and tends to displace metal downwardly as it does so. Thus while the initial metal depth may be 24 inches, continuous operation for a period of several hours may gradually produce a salt depth of 5 to 9 or 10 inches which reduces this metal depth to about 20 to 16 inches. Removing the salt periodically is advantageous and highly preferred to insure adequate metal depth in a continuous operation. That is, there is no desire in the present system to utilize significant depths of salt for any significant purpose. Efficiencies of 100 percent are achieved at start-up without any salt layer being added. In fact it is highly preferred in practicing the invention that, in order to achieve the best possible chloridization efficiencies, that the depth of the salt layer 20 be controlled, preferably by periodic removal to keep it at a minimal level, for instance a level of not over 4 inches, preferably not over 2 inches.

Another factor important in practicing the invention is to control the conditions prevailing at the agitator impeller 54. It is highly important that the chlorine bubbles be shattered and dispersed in a substantially uniform pattern substantially throughout the entire molten metal body within a chloridization zone or chamber. The agitator should be designed and controlled to provide the desired dispersion of chlorine bubbles which preferably are of a pattern whereby at least 80 percent are less than ⅛ inch and whereby 40 percent are less than 1/16 inch in diameter, no more than 10 percent being over ¼ inch in diameter as revealed in a water-air model simulating conditions within the actual aluminum chloridization chamber. Obviously it is not practical to measure the size and dispersion pattern of chlorine bubbles in an aluminum melt. However the use of water-air models, especially in conjunction with high speed motion photography, is highly beneficial to arrive at operating conditions to correlate well with conditions proved successful in actual metal treatment. That is, if the bubble size pattern for a given set of conditions as to agitator and chamber are such as to provide in such a model the bubble picture described above, such conditions should prove adequate to achieve the proper chlorine bubble size and distribution in molten aluminum. Factors which effect the bubble size and can be manipulated to achieve proper bubble size are the type, size and configuration of the impeller (blade number and size), turbine diameter (especially as related to chamber size), turbine rotation speed, turbine position and gas introduction site position. Bubble density, of course, depends on these and the additional factor of gas introduction rate.

Another highly important consideration for the agitator-contactor system is that in accordance with the invention it has been found that there should be substantially no shearing of the metal into streams or particles since such would tend to create a metal-salt emulsion and it has been found that not only does emulsification present separation problems in the settling chambers 24 and 26 but, more significantly, it has been found that if the metal is shattered or sheared into streams or droplets the droplets tend to be engulfed in the liquid salt reaction products and this seriously impedes achieving highest chloridization efficiencies and accordingly has to be avoided. Also any emulsion acts as a continuous salt phase (discontinuous metal phase) and has a similar effect on gas contact time as increasing the salt phase (decreasing the metal phase and depth $d$). Similarly with respect to bubble size but to a lesser extent, water models can be useful in determining whether a given set of agitation conditions tends to cause such shattering of the liquid phase as to promote possible emulsification.

The turbine type impeller shown in FIG. 2 when properly sized and operated is effective to achieve the desired fragmentation and distribution of the chlorine bubbles while substantially avoiding shearing or shattering of the molten metal. In a typical system where the chamber size is around 2 feet square in plan view or the chamber has an effective diameter of about 2 feet, an appropriate size for the impeller features a diameter of the turbine hub portion 55 of about 8 inches with 12 radial blades 66 approximately 2 inches square. The thickness or vertical dimension of the impeller 54 then is about 2 inches and its outer periphery is about 12 inches in diameter. If this impeller is rotated at speeds of between about 150 and 400 rpm (a peripheral speed of about 8 to 20 feet per second), proper agitation effects are achieved. A preferred rotational speed for this impeller is about 185 to about 275 rpm (peripheral speed of 9-¼ to 14 feet per second). A good nominal rotational speed is about 200 to 220 rpm (10 to 11 feet per second peripheral speed). Accordingly preferred embodiments of the invention contemplate using a gas dispersion means featuring radial paddles moved through the melt at a peripheral velocity of about 8 to 20 feet per second, preferably 9 to 14 feet per second, and the practice of the invention contemplates such agitation and dispersion effects as derivable by such operating conditions, at least in a chlorination chamber having an effective diameter of 1-½ to 2 feet or up to 3 feet. As already indicated, if the agitator is operated at too high a speed the metal shattering effects act to the detriment of complete chloridization whereas too low a speed results in inadequate bubble fragmentation and dispersion which then causes incomplete chloridization, either condition leading to the many problems which plagued the prior art practices in chloridization.

While the agitation conditions just described represent one preferred embodiment of the improvement, the invention contemplates agitation conditions definable by the relationship:

$$D/d_T = 1.5:1 \text{ to } 2:1 \qquad (1)$$

$$d_T/d_H = 1.5:1 \qquad (2)$$

$$d_T/B_T = 6:1 \qquad (3)$$

$$d_T/B_L = 6:1 \qquad (4)$$

where $D$ = effective diameter of chloridization chamber,
$d_T$ = turbine outer diameter,
$d_H$ = turbine hub diameter,
$B_T$ = thickness of turbine blades,
$B_L$ = turbine blade length The above relations seem to be appropriate for impeller rotational speeds of between 200 and 400 rpm and a chloridization chamber effective diameter of up to about 3 feet. The effective diameter means the side of a square or the smaller transverse dimension where the chamber has a rectangular lateral (plan view) section.

The agitation conditions described here are intended mainly as a guide and it is not necessarily intended to limit the invention. They do however provide a guide which in conjunction with water-air models will provide those skilled in the art with an understanding of how to practice the invention.

It has been mentioned earlier that the agitator blade depth and chlorine introduction site be as low in the melt as is practical. For instance it has been found highly desirable to position the agitator blade and introduce the gas at a level of about ½ to 2 inches above the bottom of the reaction chambers 12 and 16. For instance if the agitator is positioned 1 inch above the bottom surface the gas exiting gas inlet 59 tends to form a large bubble area beneath the hub portion 55 of the impeller 54 which gas bubble is then severely shattered by the action of the blades 56 which action occurs without any substantial metal fragmentation. This creates a dispersion of bubbles which permeates substantially the entire body of the melt throughout depth $d$ while substantially avoiding any agitation of the salt layer 20. That is, it is sometimes important that the interface 21 between the molten metal body in chamber 12 and the salt layer 20 should be relatively undisturbed by the action of the impeller and positioning the agitator as close to the bottom as possible favors bubble dispersion, lack of disturbance to the interface 21 and longer gas contact time. If the interface were substantially disturbed it would tend to prevent salt escape from the reaction sites in chamber 12 and further possibly ingest salt downwardly into the melt which would seriously curtail reaction conditions. In addition to very low impeller positioning, a quiet interface is favored by avoiding impeller design which produces strong upward currents. An impeller which features inclined blades can produce such vertical motion and are advantageously avoided in favor of a turbine type impeller whose blades produce substantially horizontal radial movement of the metal.

In practicing the invention the average metal residence time varies from about 2 to 6 minutes for each reaction zone as metal goes through the system. The average chlorine retention time in the system is approximately 4 seconds per stage based on empirical correlations which include contactor power input and gas flow rate factors. It has been found that these contact times are highly advantageous in achieving complete chloridization and complete utilization of the chlorine or chlorinaceous gas and very substantial and controlled removal of metallic impurities from the molten metal.

The capacity of the system is largely a function of the metal flow rates and the desired composition differential between the streams entering and leaving the system. One highly important aspect of the present system is that of precise control of the impurity metal content in the treated metal exit stream. It has been found that the present invention is readily capable of achieving a precision of plus or minus 0.02 percent of any desired metal content, which is often quite important with respect to an impurity element like magnesium where a controlled content is more desired than absolute removal. With respect to impurity elements like sodium or calcium which are typically present in untreated aluminum in amounts less than 0.02 percent, the present improvement is capable of achieving levels of 0.0001 percent or even less in the treated metal. Because the system efficiencies are substantially 100 percent the system can be considered substantially stoichiometric, even when operated continuously and this level of performance, it is believed, has not heretofore been achieved in a commercially practical system. In order to achieve a desired content of an impurity metal such as magnesium a material balance is run based on metal flow rate and the magnesium differential between inlet and outlet streams to determine the chlorine rate based on stoichiometric performance.

The system shown in the figures features level flow conditions which makes the improved system highly compatible with existing aluminum plants, which for the most part, feature level pour systems, since such favor less generation of oxide than would a system having a substantial drop in elevation. Thus the inlet 30 can be, and preferably is, at substantially the same elevation as the outlet 40 or not more than a few inches above the outlet and molten metal is fed into reaction chamber 12 under such conditions as to favor a molten metal height above the highest point of the inlet 30 as is shown in the figure. Also the figures illustrate preferred embodiments wherein the molten metal is passed through two or more reaction chambers in series followed by one or more settling chambers in series since it has been found that these systems offer the most efficient operating conditions from the standpoint of complete chlorine utilization and high rates of impurity metal removal. However if desired a single chloridization chamber could be employed or more than two chambers in series could be employed. A single chamber would lower the maximum rate of impurity metal removal but offer cost advantages whereas more chambers would favor more removal but would obviously cost more.

Figure 3:
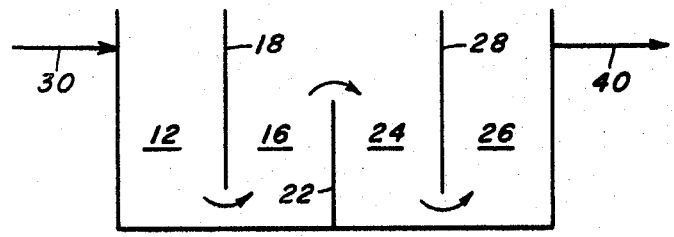
FIGS. 3 through 5 are highly schematic illustrations of embodiments of the invention which depart from the specific arrangements of FIG. 1.
Figure 4:
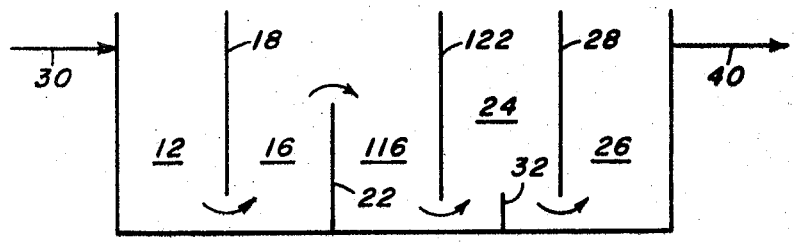
Figure 5:
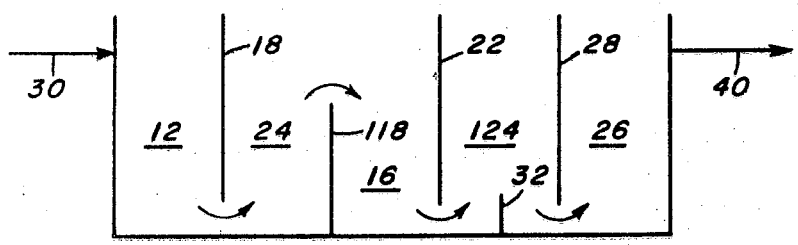

There are a number of arrangements of multiple chloridization zones as shown in FIGS. 3 through 5. In FIG. 3 first and second chloridization chambers 12 and 16 are separated by underflow baffle 18 as in the FIG. 1 arrangement. However instead of underflowing the baffle 22 separating the second reaction chamber 16 from the settling chamber 24 as in FIG. 1, the FIG. 3 embodiment features metal flow over the baffle 22. This offers an advantage of possible longer contact times in the zone 16 and may be preferred over the arrangement of FIG. 1 in this respect. In FIG. 4, first and second chloridization zones 12 and 16 are the same as FIG. 3 but overflow baffle 22 now provides for a third chloridization chamber 116 from which the metal passes under baffle 122 into separation zone 24. The metal passes from zone 24 as in the FIG. 1 arrangement. The FIG. 5 arrangement features a distinct separation zone for each chloridization zone. In FIG. 5 treated metal exits first chloridization zone 12 by passing under baffle 18 and proceeds through first separation zone 24 before overflowing baffle 118 into the second chloridization chamber 16. From chamber 16 the metal passes under baffle 22 into second separation chamber 124 and then proceeds along the lines of the other arrangements. The possible advantage in the FIG. 5 arrangement is that any metal-salt emulsion formed in the first chloridization zone 12 has a chance to separate before encountering the second chloridization zone 16. In practicing the invention any reasonable number of chloridization and settling chambers can be employed but that the first and last baffles, those after the first chloridization zone 12 and before the pure metal zone 26, are of the underflow type.

Another important aspect in practicing the invention is that any heat applied to the molten metal within the reaction and settling chambers introduce no combustion products into the system. Accordingly indirect heating is very much favored and can be accomplished by immersion tubes which are fired on their inside surfaces or otherwise heated as by electrical means. Since chloridization of aluminum is exothermic, the principal purpose of heating provisions is to maintain molten conditions during interruptions or down time.

From the standpoint of materials of construction it is preferred that the agitator shaft and impeller be manufactured from a refractory material such as graphite which should be of a grade which is not deteriorated by molten aluminum. The dense and combustion resistant grades are useful for this purpose, the shaft being of the combustion resistant grade and the impeller of the dense grade for erosion resistance. In addition the use of ferrous based metals within the system are preferably avoided although the outside of the walls 11 can be housed in a steel vessel which preferably features water cooling. The walls 11 and floor as well as the baffles can be supplied in any suitable refractory material such as silicon carbide, high alumina or graphite refractories. The important thing here is that the refractory material be of a high quality and resistant to molten aluminum, gaseous chlorine and the salt reaction products.

In starting the system the container 10 is first filled with molten aluminum to a depth which covers both the inlet and outlet nozzles. The depth, of course, should be such as to provide a minimum depth d specified for reaction chambers 12 and 16, it being remembered that the depth $d$ diminishes as the process proceeds by displacement by the molten salt layer 20. Accordingly where it is desired to maintain a minimum depth $d$ of 15 inches above gas inlet 59 it is well advisable to commence with a molten metal depth of at least 22 or 24 inches. Under these conditions as the molten salt layer becomes deeper it is periodically removed before the molten metal diminishes below the minimum desired depth $d$, in this case 15 inches.

Prior to starting there typically is no need to add salt above the molten metal since the salt layer produces no significant benefit in practicing the invention but, indeed, offers the possible disadvantage of displacing molten metal. Accordingly commencing the operation with a salt layer, of say 2 or 3 inches, can be disadvantageous in some practices of the invention since it can hasten the point in time at which the salt layer should be tapped off.

Heat is introduced to the system to conserve the heat content of the molten aluminum and chlorine is introduced as the agitator blades are started. Since the chloridization reactions are exothermic the heating can be stopped once chloridization is started. Once the agitator blades are started and the chlorine introduction has commenced the molten metal is flowed through the unit since the chloridization rates and efficiencies in the improved process are so high that failure to flow molten metal through the system will simply result in excessive fumes since the reactive metallic impurities are very rapidly consumed.

In order to illustrate the advantages in practicing the invention the following examples proceed. In each example, except for Examples 8 and 10, the metal treated was aluminum-silicon alloy scrap of a quality which typifies secondary aluminum scrap metal. Except as noted the arrangement employed was basically that depicted in FIG. 1 employing a turbine impeller of the type described above as preferred having a peripheral diameter of 12 inches and a hub diameter of 8 inches with twelve 2 inch square blades. Examples 1 and 2 are continuous processes wherein about 13,000 pounds per hour of aluminum is treated in the arrangement shown in FIG. 1 with the agitator operated at 200 rpm. The details of examples 1 and 2 are set forth in Table I.

TABLE I

| | Example | |
|---|---|---|
| | 1 | 2 |
| Inlet Mg conc, wt. % | 0.53 | 0.60 |
| Outlet Mg conc, wt. % | 0.18 | 0.17 |
| $Cl_2$ input, lbs/hr | 128.0 | 132.3 |
| Mg removed, lbs/hr | 43.9 | 45.4 |
| Percent $Cl_2$ reacted to $MgCl_2$ | 100 | 100 |
| $MgCl_2$ byproduct, lbs/hr | 172 | 178 |
| Avg. reaction temp, °C | 737 | 750 |
| Hydrogen content in product, mls/100 gms | <0.12 | <0.12 |

Examples 1 and 2 illustrate the high efficiencies achieved by the practice of the invention. It should be noted that the $MgCl_2$ byproduct is anhydrous having a purity level of typically 95 to 98 percent, or better, and is accordingly a valuable byproduct.

Examples 3 and 4 compare the present process with the old-fashioned furnace fluxing process and the details of the examples are set forth in Table II.

TABLE II

| | Example | |
|---|---|---|
| | 3 | 4 |
| Treatment | Improved-Continuous | Furnace Flux |
| Mg removed | 0.2% | 0.2% |
| Size of melt, lbs | 44,000 | 45,500 |
| $Cl_2$ consumption, lbs | 257 | 366 |
| Fluxing time, hrs | none—continuous | 1.72 |
| Percent $Cl_2$ reacted to $MgCl_2$ | 99.92 | 80 |
| Flue gas content | | |
| Free chlorine mg/cu. meter | 8.3 | 670 |
| ppm | 2.7 | 224 |
| Chlorides mg/cu. meter | 7.4 | 13,800 |

From Table II it is very apparent that the improved process offers advantages over furnace fluxing with respect to chlorine utilization and pollution control.

Examples 5 through 7 involve operation of the present process on a re-circulating basis in order to illustrate that while the present improvement is capable of continuous operation, it is also capable of a re-circulating batch type operation wherein molten metal leaving the unit is re-circulated through the unit. The results of Examples 5 through 7 are shown in Table III.

TABLE III

| | Example | | |
|---|---|---|---|
| | 5 | 6 | 7 |
| Metal flow rate, lbs./hr | 11,500 | 13,150 | 12,000 |
| Initial Mg content, % | 0.9 | 3.1 | 3.0 |
| Final Mg content, % | 0.46 | 0.29 | 0.11 |
| $Cl_2$ input, lbs./hr | 98 | 136 | 137 |
| Mg removal rate, lbs./hr | 33.6 | 46.7 | 46.9 |
| $Cl_2$ reacted to $MgCl_2$, % | 100 | 100 | 100 |
| Recirculation time, hrs. | 1 | 4 | 4 |
| Number of stages | 1 | 2 | 2 |

Example 8 illustrates the capability of the present improvement to reduce the magnesium content to very low levels while maintaining high chlorine utilization efficiencies in a high capacity continuous flow system. The particulars of Example 8 are as follows:

| Metal flow rate, lbs/hr | 58,000 |
|---|---|
| Initial Mg content, % | 0.029 |
| Final Mg content, % | 0.006 |
| $Cl_2$ input, lbs/hr | 39.8 |
| Mg removal, lbs/hr | 13.2 |
| Percent $Cl_2$ reacted to $MgCl_2$ | 97.0 |
| Typical free $Cl_2$ emission | 1.7 ppm |
| | 4.8 mg/m³ |

While the chlorine reaction efficiency is less in Example 8 than the earlier examples it has to be remembered the Mg here is removed to a very low level where efficiencies would be expected to drop off. Nonetheless the 97 percent efficiency is quite impressive.

From all of the above examples it can be seen that the present process is capable of handling a variety of inlet conditions with respect to impurity content and consistently achieves efficiencies in chlorine utilization approaching 100 percent and more significant is the fact that substantially all of the chlorine is reacted to the impurity metal salt. The improved process has been demonstrated to be capable of removing magnesium down to levels of 0.05 percent and less in that the system has demonstrated the capability of removing magnesium down to levels of 0.005 percent although as the outlet impurity metal content goes below 0.05 percent, some loss in efficiency might be encountered. In addition to removing magnesium and other metallic impurities the improved process has demonstrated the capability of removing gas impurities down to levels of 0.15 ml per 100 gms of metal or less, for instance levels of 0.10 ml per 100 gms or even less. Further, oxide content can be substantially reduced by the improved process as revealed by vacuum gas density tests which typically show an inlet metal density of 2.4 gms per cc increased to 2.7 gms per cc in the treated metal.

The invention has been described thus far principally with respect to removing or reducing the content of magnesium, sodium and calcium. However, in a broader sense the invention contemplates the removal of other elements as well which are capable of chloridization in an aluminum melt wherein the impurity element reacts with chlorine to form its chloride salt. Such an element is one whose negative ratio of free energy of formation of its chlorides divided by its valence is greater than that of aluminum in a chloride system. These elements include, in addition to magnesium, sodium and calcium, the elements strontium, lithium and potassium.

Particularly where the invention is practiced for the removal of elements like sodium, calcium or strontium which are usually present in small levels of, typically, 0.002 percent in the untreated metal and it is desired to further reduce them to levels of about 0.0002 percent or 0.0001 percent or even less, one practice contemplated by the invention features including, along with the chlorinaceous gas, a non-reactive gas. That is, since the chlorinaceous gas is added in an amount stoichiometrically related to the impurity element in the metal being treated or related to the amount of that element which is to be removed, and since, as described above, certain bubble distribution patterns are highly favored in practicing the invention, it will be apparent that the amount of gas necessary to form the bubble pattern can exceed the very small amount of chlorinaceous gas stoichiometrically related to an impurity element present in a miniscule quantity. The non-reactive gas serves the purpose of facilitating the desired bubble distribution pattern without using excessive amounts of chlorinaceous gas which could cause pollution problems. Suitable non-reactive gases include the so-called inert gases such as helium, neon, argon, krypton and xenon and mixtures thereof along with nitrogen and, to a less desired extent, carbon dioxide. In the case of nitrogen and carbon dioxide, precautions are warranted to avoid the formation of nitrides, oxides, carbides or complexes thereof. Argon serves quite well and is considered preferred because of its effectiveness and availability.

The respective amounts of chlorinaceous and nonreactive gases suitably employed in practicing the invention can vary considerably depending on the impurities present in the untreated metal and the desired condition in the treated metal. Where the untreated metal contains substantial amounts of magnesium and where substantial amounts of chlorinaceous gas are contemplated to considerably reduce the amount of the magnesium, typically there may be little or no advantage in employing a non-reactive gas since removal of magnesium along with substantial amounts of oxide and gas impurities is readily accomplished by the chlorinaceous gas, although even here some non-reactive gas may be advantageous with respect to removal of gas impurities from the metal. Where, however, it is desired to remove sodium or calcium which typically don't exceed about 0.002 percent even in untreated metal, or where it is desired to remove low amounts of magnesium, the amount of chlorinaceous gas to be introduced is decreased markedly in comparison to the conditions just described with respect to larger amounts of magnesium. However, achieving the bubble distribution pattern desired in accordance with the invention requires more than the miniscule amount of chlorinaceous gas required and this deficiency is satisfied by the use of argon or another inert gas, for instance 0.005 S.C.F. or more of gas, chlorinaceous and non-chlorinaceous, for each pound of molten metal passing through the system. Where the stoichiometric amount of the chlorinaceous gas is ample to satisfy this level or a preferred level of 0.01 S.C.F. or more of gas per pound of metal, there may be no need to augment that gas with a non-reactive or inert gas. Where, however, the stoichiometric amount of the chlorinaceous gas is inadequate to fulfill this amount then it is advantageously augmented with a non-reactive gas in order to assure the desired bubble distribution pattern and to favor the removal of oxide and gas impurities as well as metallic impurities. Typically in treating molten aluminum for the removal of sodium or calcium, the comparative amounts of chlorinaceous and non-reactive gas would be less than 1 percent up to 20 percent, typically 1 to 5 percent, chlorinaceous gas and 99 or more to 80 percent, typically 99 to 95 percent, non-reactive gas although these figures to a 80 percent, typically really only typical and the invention contemplates, in its broadest sense, widely varying proportions of the two types of gas, for instance as little as ½ or ¼ percent or less, for instance, 0.1 percent, or as high as 60 percent or even 80 percent or more chlorine. Obviously, as far as the ratio of one gas to the other is concerned, such can be greater or lesser than unity.

The amount or rate of chlorine or other chlorinaceous gas is approximately that amount which reacts with the metallic element impurities to produce their chlorides. The amount of such elements and the desired extent of their removal can vary widely and accordingly the amount or rate of chlorine will vary widely. For instance considering treatment of molten aluminum containing a small amount of an impurity element, such as 0.0015 percent sodium, the amount of chlorine would be very small. When the chloridizable element is present in very small amounts, for instance less than 0.03 percent, and particularly in amounts of under 0.005 percent, the amount of chlorine employed may be in excess of the exact stoichiometric equivalent. This is because the reaction conditions in dealing with miniscule impurity levels make it obvious that some excess is advisable to assure as complete a chloridization as possible. However, even employing $Cl_2$ in three or four times the stoichiometric amount of 0.0015 percent Na still involves a miniscule amount of $Cl_2$ and the excess is readily consumed by other reactable elements such as Mg which is often present. Thus for such miniscule amounts of impurities a stoichiometrically related amount of chlorinaceous gas includes an excess of several times the theoretical exact stoichiometric equivalent. However when the chloridizable impurity element such as magnesium is present in a sizable amount, for instance 0.05 percent, or 0.5 percent or more magnesium, a stoichiometrically related amount of chlorinaceous gas more closely approaches the exact equivalent since the substantially larger amounts of chlorinaceous gas can hardly be consumed in the melt or simply vented to the atmosphere. The same applies to the situation where an element is to be reduced but to a controlled level, for instance Mg is to be reduced from 3.5 percent to 2.5 percent. The stoichiometrically related amount is substantially the equivalent of the 1 percent Mg to be removed. Hence a stoichiometrically related amount of chlorinaceous gas is certainly related to the theoretical equivalent but the exactness of the relationship can vary depending on the amount of the chloridizable element to be reacted. Where that amount reacted is less than about 0.03 percent and particularly where less than 0.01 percent, especially 0.005 percent and less, the amount of chlorine or chlorinaceous gas can substantially exceed the theoretical equivalent of the element. Where that amount of an element to be chloridized is around 0.03 percent and higher, the chlorine or chlorinaceous gas is provided in an amount approximately equal to the theoretical equivalent.

Since, as just shown, the amount or rate of chlorinaceous gas can vary widely, it follows that the relative amounts of chlorinaceous and non-reactive gas can vary widely and this accounts for the wide percentage ranges stated earlier (as little as 0.1 percent $Cl_2$ and as much as 80 percent or more in a $Cl_2$-A mixture).

When employing very small amounts of chlorinaceous gas, and referring once more to FIG. 1, there need be less provision for separating the reaction products from the molten aluminum since the amount of reaction product produced would be quite miniscule. It is also usually possible in such instances to employ only a single contacting zone rather than two stages or zones as shown in FIG. 1, again for essentially the same reason, less reactants to contact. Thus in the system shown in FIG. 1 and referring to the treatment of molten aluminum to remove a small amount of sodium, for instance treating molten aluminum containing about 0.001 sodium, there need only be a single reaction or chloridization chamber 12 and the metal running under baffle 19 can pass directly to outlet chamber 26 thus omitting the second chloridization chamber 16 and a separate settling chamber or zone 24. The amount of salt reaction product reduced in the treatment of this molten aluminum would be extremely small and it would not under normal circumstances create problems even if substantial portions thereof escape with the molten metal.

Example 9 illustrates the operation of the improvement using a chlorine-argon gas mixture to treat molten aluminum containing 0.053 percent magnesium. The particulars of this example are as follows:

Example 9

| | |
|---|---|
| Metal flow rate lbs./hr | 38,000 |
| Initial Mg content % | 0.053 |

-Continued
Example 9

| | |
|---|---|
| Final Mg content % | 0.013 |
| Initial $H_2$ content ml/100 gm | 0.41 |
| Final $H_2$ content ml/100 gm | 0.10 |
| Total gas to metal ratio SCF/lb. | 0.013 |

The gas employed in Example 9 contained 56 percent $Cl_2$ and 44 percent A, the chlorine being provided in an amount approximately equivalent to the Mg desired to be removed and the chlorine utilization efficiency being approximately 100 percent. The argon was added simply to bring the gas to metal ratio to a preferred level of over 0.01 so as to enhance gas removal which is reflected in the very low hydrogen content in the treated metal.

Example 10 illustrates the operation of the improved process to remove sodium and calcium metallic impurities together with hydrogen gas and oxide inclusions from aluminum alloy 1100 employing a mixture of chlorine and argon gases containing from about 0.8 to 1.7 percent $Cl_2$. The particulars are set forth below:

Example 10

| | | |
|---|---|---|
| Metal flow rate, lbs./hr | | 20,000 |
| Initial Na content, % | | 0.0011 |
| Final Na content, % | under | 0.0002 |
| Initial Ca content, % | | 0.0006 |
| Final Ca content, % | | 0.0001 |
| Initial $H_2$ content, ml/100 gm | | 0.37 |
| Final $H_2$ content, ml/100 gm | | 0.125 |
| Initial vacuum gas density, gm/cm³ | | 2.59 |
| Final vacuum gas density, gm/cm³ | | 2.70 |
| Gas flow, SCFH  A | | 230 |
| $Cl_2$ | | 2 to 4 |

It is readily apparent that the improved process substantially improved the quality of the molten aluminum by very significantly reducing metallic, oxide and gas impurity content. Moreover similar results have been achieved with aluminum alloys containing substantial amounts of Mg, the process selectively removing Na and Ca without significant Mg loss.

While the invention has been described in terms of preferred embodiments, the claims appended hereto are intended to encompass all embodiments which fall within the spirit of the invention.

Having thus described our invention and certain embodiments thereof, we claim:

1. In the process of purifying molten aluminum the steps comprising:
   1. contacting within a chloridization chamber said molten aluminum with a gas comprising a reactive chlorinaceous gas introduced at a site substantially 10 inches or more below the upper surface of the molten aluminum being treated to react chlorine with metallic impurities in said aluminum and produce the chloride salts of said impurity metals,
   2. maintaining at the region of said chlorinaceous gas introduction agitation conditions which produce in the melt a substantially uniform distribution of small gas bubbles which prevails substantially throughout the molten aluminum in said chloridization chamber while substantially avoiding any fragmentation or shattering of the molten metal so as to substantially avoid emulsification of molten aluminum and chloride salt phases.

2. The process according to claim 1 wherein the agitation conditions maintained are such as are derivable by a turbine blade 12 inches in outside diameter having 12 paddles of about 2 inches by 2 inches and rotating at a speed of from 150 to 400 rpm.

3. The process according to claim 1 wherein said chlorinaceous gas is chlorine.

4. The process according to claim 3 wherein the agitation means is a turbine impeller and the chlorine is introduced at the center of rotation of said turbine which turbine is positioned within 2 inches of the bottom of said chloridization chamber.

5. The method according to claim 1 wherein the molten metal is passed through multiple chloridization chambers followed by at least one settling chamber to facilitate separation of molten metal from any occluded salt.

6. The continuous method of treating molten aluminum containing at least one metallic impurity selected from the group consisting of magnesium, sodium and calcium, comprising the steps:
 1. passing said molten aluminum through a first chloridization chamber wherein it is contacted with a gas comprising chlorine gas introduced at a point at least 10 inches below the upper surface of the molten aluminum within said chamber to react said metallic impurity with chlorine to produce the chloride salt thereof,
 2. maintaining agitation conditions substantially at the site of chlorine introduction which provide for a substantially uniform distribution throughout said molten aluminum in said chamber, the bubble pattern corresponding to that revealed in an air-water model simulation wherein at least 60 percent of the bubbles are not more than ⅛ inch in diameter, and whereby substantially all molten metal shattering and shearing effects are avoided, said agitation conditions being equivalent to those derivable from a turbine blade 12 inches in outside diameter having 12 paddles of about 2 inches by 2 inches and rotating at a speed of from 150 to 400 rpm.

7. The method according to claim 1 wherein impurity metal chloride salt reaction product is removed from said chloridization chamber to prevent an excessive build-up of salt so as to maintain said 10 inch minimum metal depth above said chlorinaceous gas introduction site.

8. The method according to claim 1 wherein said chlorinaceous gas is provided in an amount stoichiometrically related to the amount of said impurities to be removed.

9. The method according to claim 1 wherein said gas also comprises a non-reactive gas in addition to said chlorinaceous gas.

10. The method according to claim 9 wherein said amount of gas introduced is at least 0.005 SCF per pound of molten aluminum treated.

11. The method according to claim 9 wherein the relative amount of chlorinaceous gas is small in comparison to the non-reactive gas.

12. The method according to claim 9 wherein the chlorinaceous gas is chlorine and the non-reactive gas is selected from argon or nitrogen or mixtures thereof and the amount of chlorine is relatively small in comparison with the non-reactive gas.

13. The process of purifying molten aluminum comprising:
 1. contacting within a chloridization chamber said molten aluminum with a gas flux comprising a chlorinaceous gas, said gas flux being introduced at a site at least 10 inches below the upper surface of the body of molten metal being treated to react said chlorinaceous gas with said metallic impurities in said aluminum and produce chloride salts of said metallic impurities;
 2. maintaining at the region of said chlorinaceous gas introduction, agitation conditions which produce in the molten aluminum a substantially uniform distribution of small gas bubbles while substantially avoiding emulsification between the molten aluminum and other non-gas phases.

14. A method according to claim 13 wherein said agitation conditions maintained are such as are derivable from a turbine blade 12 inches in outside diameter having 12 paddles of about 2 inches by 2 inches and rotating at a speed of from 150 to 400 rpm.

15. The method according to claim 14 wherein the rotation speed of said turbine blade is from 150 to 275 rpm.

16. The method according to claim 13 wherein the agitation conditions are produced by a multiple bladed impeller rotating at a peripheral speed of 8 to 20 feet per second.

17. The method according to claim 16 wherein the said gas flux is introduced to the central portions of the agitation zone of said impeller.

18. The method according to claim 13 wherein the agitation conditions are produced by a multiple bladed impeller rotating at a peripheral speed of 8 to 14 feet per second.

19. The method according to claim 14 wherein the ratio of the smaller dimension across the body of the molten metal in inches to the diameter of impeller in inches is between 1.5 and 2:1.

20. The method according to claim 13 wherein said agitation conditions are effected by a rotating vaned impeller operated so as to be equivalent to a turbine blade 12 inches in outside diameter having 12 paddles of about 2 inches by 2 inches and rotating at a speed of from 150 to 400 rpm and the ratio of the smaller dimension across the body of the molten metal in inches to the diameter of impeller in inches is between 1.5 and 2:1.

21. The method according to claim 13 wherein said gas also comprises a non-reactive gas in addition to said chlorinaceous gas.

22. The method according to claim 13 wherein said amount of gas introduced is at least 0.005 SCF per pound of molten aluminum treated.

23. The method according to claim 21 wherein the relative amount of chlorinaceous gas is small in comparison to the non-reactive gas.

24. The method according to claim 13 wherein the chlorinaceous gas is chlorine and the non-reactive gas is selected from argon or nitrogen or mixtures thereof and the amount of chlorine is relatively small in comparison with the non-reactive gas.

25. In the process of purifying molten aluminum the steps comprising:
 1. contacting said molten aluminum with a gas comprising a reactive chlorinaceous gas introduced substantially 10 inches or more below the upper surface of the molten metal being treated to react chlorine with metallic impurities in said aluminum to produce the chloride salts of said impurity metals, 2. maintaining in the region of said chlorinaceous gas introduction agitation conditions which produce in the molten aluminum being treated a substantially uniform distribution of small gas bubbles while substantially avoiding emulsification of molten aluminum and other non-gas phases.

26. The process according to claim 25 wherein the agitation conditions maintained are such as are derivable by a turbine blade 12 inches in outside diameter having 12 paddles of about 2 inches by 2 inches and rotating at a speed of from 150 to 400 rpm.

27. The process according to claim 26 wherein the rotation speed of said turbine blade is from 150 to 275 rpm.

28. The process according to claim 25 wherein the agitation conditions are produced by a multiple bladed impeller rotating at a peripheral speed of 8 to 20 feet per second.

29. The process according to claim 28 wherein the said gas flux is introduced to the central portions of the agitation zone of said impeller.

30. The process according to claim 25 wherein the agitation conditions are produced by a multiple bladed impeller rotating at a peripheral speed of 8 to 14 feet per second.

31. The process according to claim 26 wherein the ratio of the smaller dimension across the body of the molten metal in inches to the diameter of impeller in inches is between 1.5 and 2:1.

32. The process according to claim 25 wherein said agitation conditions are effected by a rotating vaned impeller operated so as to be equivalent to a turbine blade 12 inches in outside diameter having 12 paddles of about 2 inches by 2 inches and rotating at a speed of from 150 to 400 rpm and the ratio of the smaller dimension across the body of the molten metal in inches to the diameter of impeller in inches is between 1.5 and 2:1.

33. The process according to claim 25 wherein said gas also comprises a non-reactive gas in addition to said chlorinaceous gas.

34. The process according to claim 25 wherein said amount of gas introduced is at least 0.005 SCF per pound of molten aluminum treated.

35. The process according to claim 33 wherein the relative amount of chlorinaceous gas is small in comparison to the non-reactive gas.

36. The process according to claim 25 wherein the chlorinaceous gas is chlorine and the non-reactive gas is selected from argon or nitrogen or mixtures thereof and the amount of chlorine is relatively small in comparison with the non-reactive gas.

37. The process according to claim 25 wherein the agitation conditions maintained are such as are derivable by a turbine blade 12 inches in outside diameter having 12 paddles of about 2 inches by 2 inches and rotating at a speed of from 150 to 400 rpm.

38. The process according to claim 25 wherein the chlorinaceous gas is chlorine.

39. The process according to claim 25 wherein impurity metal chloride salt reaction product is removed from said chloridization chamber to prevent an excessive build-up of salt so as to maintain said substantially 10 inch or more metal depth above said chlorinaceous gas introduction site.

40. The process according to claim 25 wherein said chlorinaceous gas is provided in an amount stoichiometrically related to a preselected portion of said impurities to be removed.

* * * * *

UNITED STATES PATENT OFFICE
CERTIFICATE OF CORRECTION

Patent No. 3,839,019      Dated October 1, 1974

Inventor(s) Marshall J. Bruno, Noel Jarrett, Burl L. Slaugenhaupt and Robert E. Graziano It is certified that error appears in the above-identified patent and that said Letters Patent are hereby corrected as shown below:

Col. 12, line 40      After "figures" delete "to a 80 percent, typically" and insert --are--.

Signed and sealed this 3rd day of December 1974.

(SEAL)
Attest:

McCOY M. GIBSON JR.
Attesting Officer

C. MARSHALL DANN
Commissioner of Patents